UNITED STATES PATENT OFFICE.

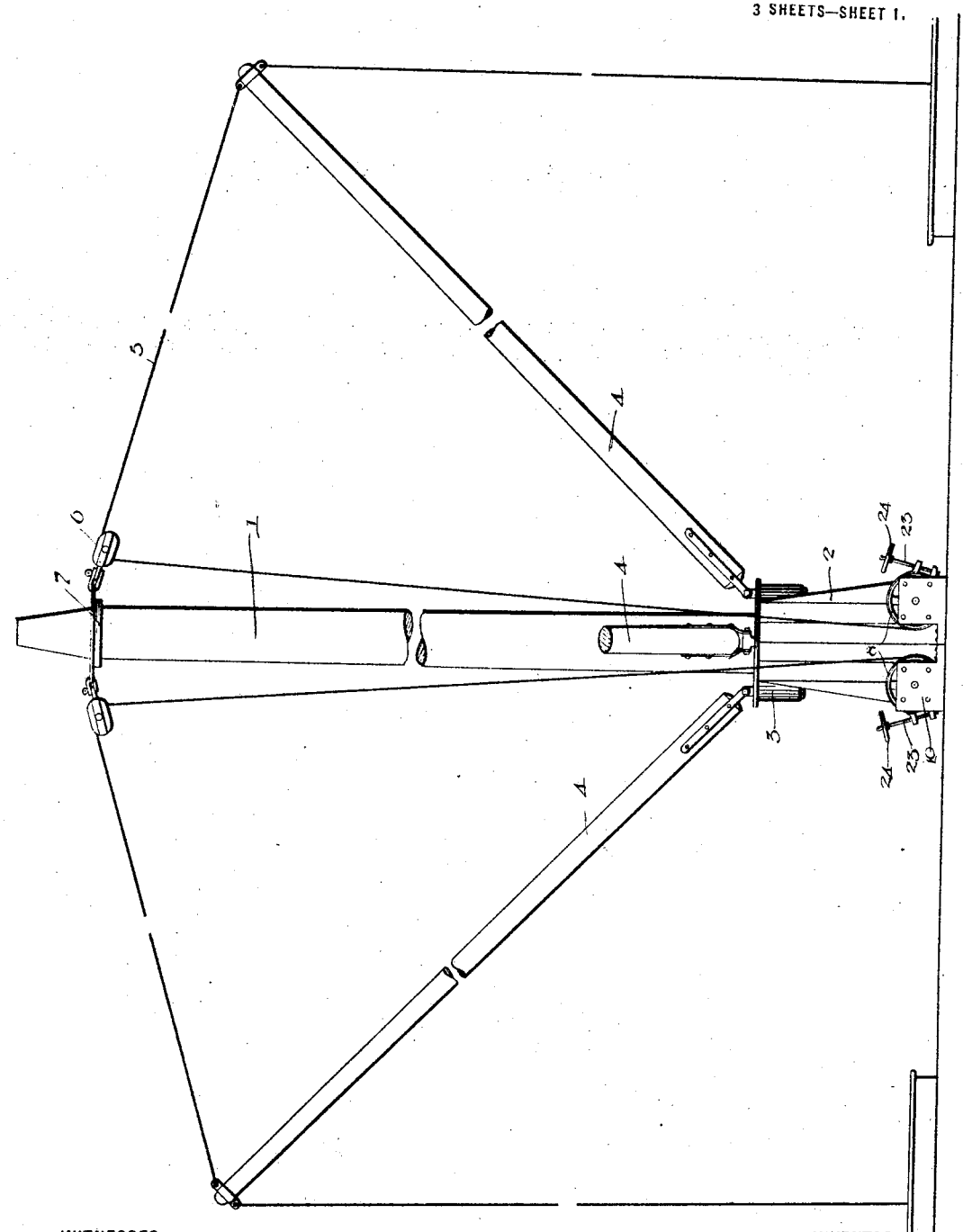

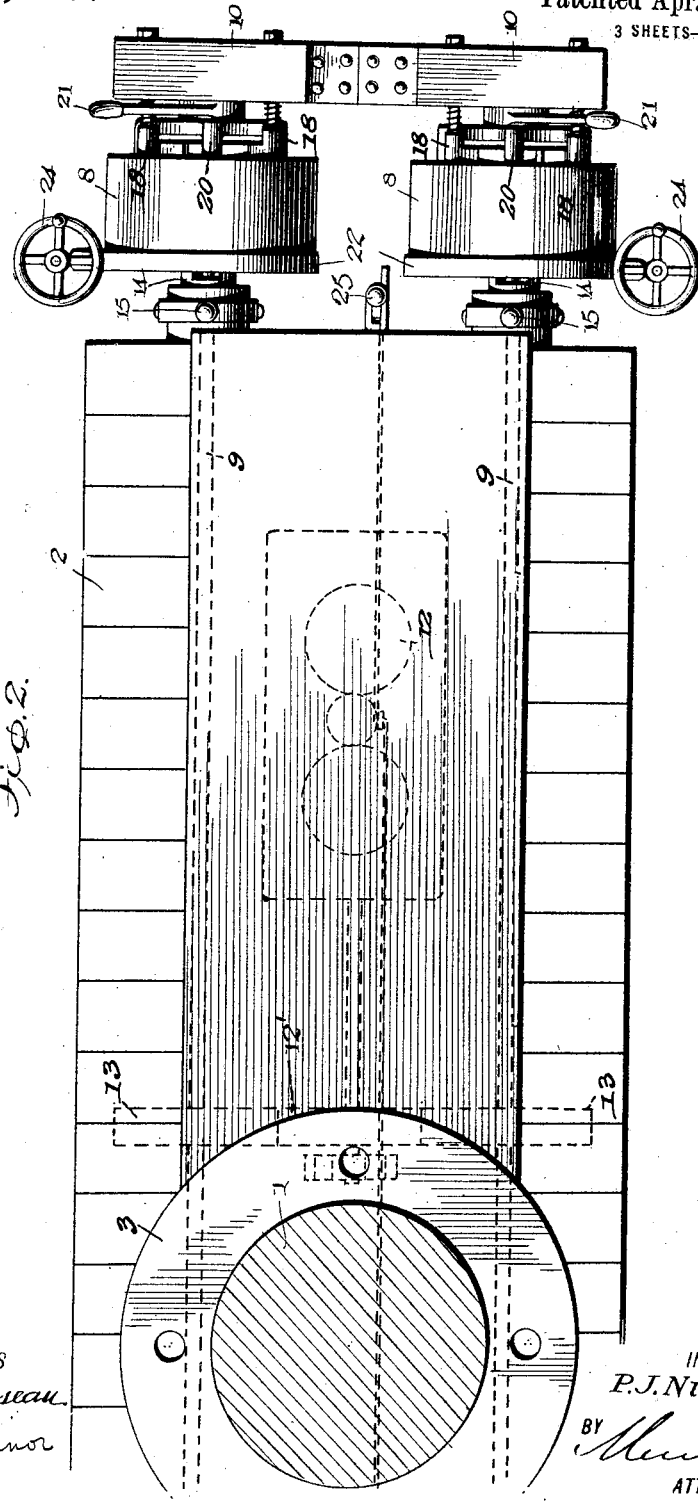

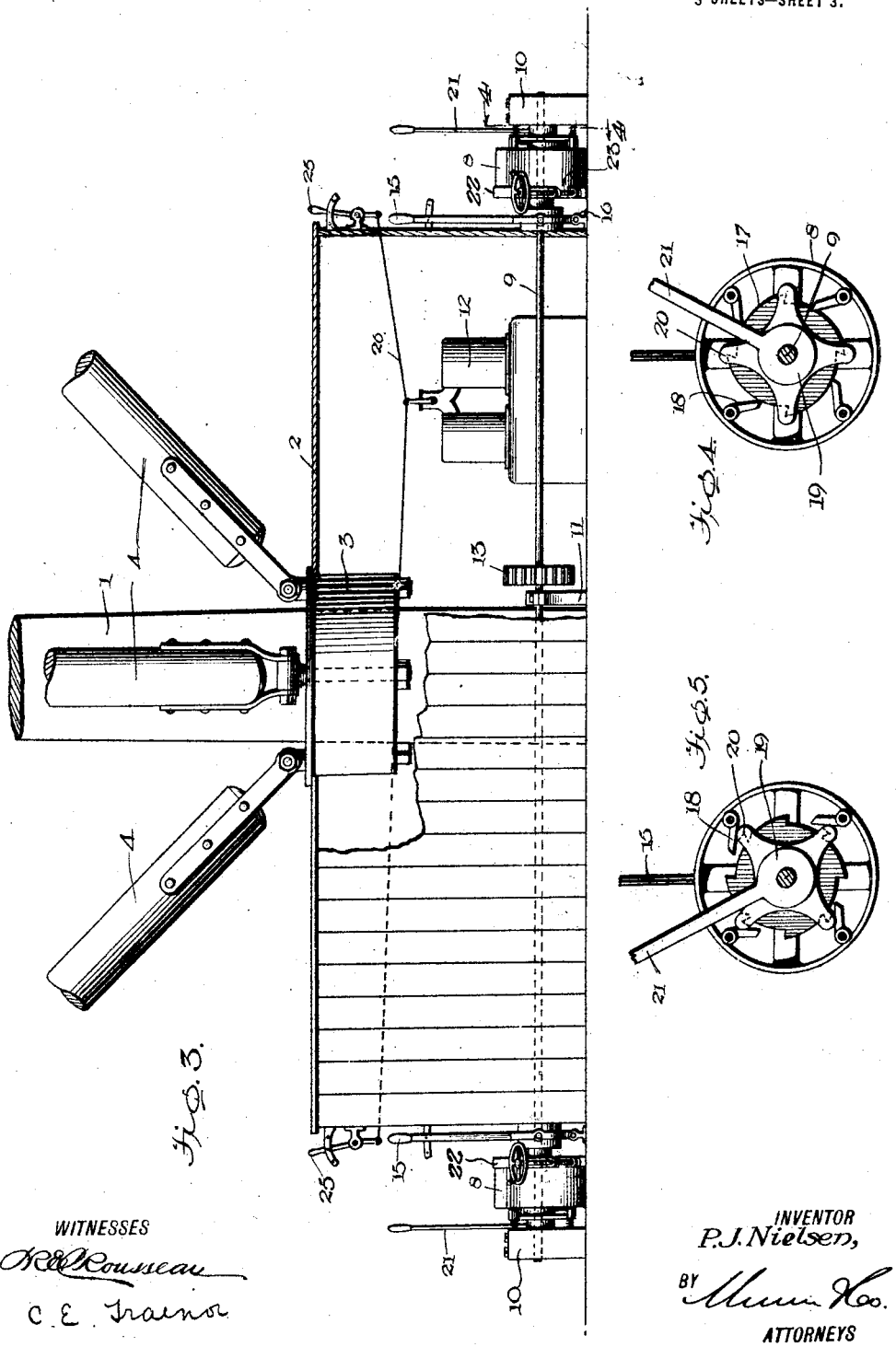

PETER JULIUS NIELSEN, OF PHILADELPHIA, PENNSYLVANIA.

BOOM WINCH.

1,411,295.  Specification of Letters Patent.  Patented Apr. 4, 1922.

Application filed February 8, 1921. Serial No. 443,408.

*To all whom it may concern:*

Be it known that I, PETER JULIUS NIELSEN, a subject of the King of Denmark, and a resident of Philadelphia, in the county of Philadelphia and State of Pennsylvania, have invented certain new and useful Improvements in Boom Winches, of which the following is a specification.

My invention is an improvement in boom winches, and has for its object to provide mechanism of the character specified, especially adapted for use in connection with ships, for controlling the raising and lowering of the booms, wherein each boom may be independently controlled.

In the drawings:

Figure 1 is a side view of a mast and its booms together with the controlling mechanism therefor, Figure 2 is a top plan view of one end of the winch housing, Figure 3 is a front view of the foot of the mast and winch housing, Figure 4 is a view of the pawl and ratchet connection and the controlling mechanism therefor with the said mechanism in one position, the view being taken on line 4—4 of Figure 3, Figure 5 is a similar view with the parts in another position.

As is known in vessels the foot of the mast 1 passes through a housing 2, which extends transversely of the vessel on both sides of the mast, and within this housing the winch construction is arranged. A collar 3 is secured to the mast at the top of the housing and to this collar the booms 4 are hinged to swing upwardly and downwardly at their free end, the swinging being controlled by flexible members 5 which pass from the booms over pulleys 6 supported by a collar 7 near the head of the mast and wind upon reels 8 to be described.

A reel is provided for each boom, and the reels are arranged in pairs, one pair at each end of the housing 2. Each pair of reels is secured to a pair of parallel shafts 9, and the shafts 9 are journaled in pillow blocks 10 and 11, the blocks 10 being at the ends of the housing 2, while the blocks 11 are within the housing at opposite sides of the mast. The shafts are driven by a suitable motor indicated at 12, and with any desired construction. The motor 12 is arranged between the shafts 9, and the shaft of the motor is provided with a gear wheel 12' which meshes with similar gears 13 on the shafts 9. Thus when the motor is running the shafts 9 will be driven. Each reel is loose on the shaft 9, and is adapted to be connected therewith by a clutch 14 of any desired construction, each of the said clutches comprising a relatively fixed section on the reel and a movable section on the shaft, which is movable toward and from the fixed section by means of a lever 15.

Each of these levers is pivoted to a fixed support 16 on the deck and each lever has a ring intermediate its ends through which the movable section of the clutch passes, and the ring is pinned to the clutch. Means is also provided for holding the lever in adjusted position, and it will be evident by swinging the proper lever in the proper direction any reel may be connected with its shaft.

The reels are not directly connected with the shafts being connected to the shafts solely by the clutch. The pawl and ratchet connection comprises a ratchet wheel 17, which is part of the drum and reel and a series of pawls 18 are pivoted to the pillow block 10 on the outside of the winch. These pawls engage the ratchet wheel, being spring pressed towards the wheel and it is evident that when they are in engagement with the wheel the boom cannot be lowered before said pawls are released.

Mechanism is also provided for simultaneously disengaging all of the pawls, to permit the reel to run free. It will be understood that when a shaft 9 is rotating in a direction to wind up a rope 5 on the reel the pawl and ratchet mechanism will constrain the wheel to turn with the ratchet wheel, and that the reel may turn in this direction, that is in a direction to wind up the rope, but may not turn in the opposite direction unless the pawl and ratchet mechanism is released.

The mechanism for simultaneously releasing the pawls is a disk 19 journaled on the shaft 9, and provided with a series of cam arms 20, the said arms corresponding in number and spacing to the number and spacing of the pawls. This disk 19 is operated by a lever 21, and the arms 20 are so positioned that they will engage the pawls and will release them as shown in Figure 5, when the lever 21 is moved in the proper direction.

A brake is provided in connection with each reel. Each brake comprises a ring 22 which encircles the drum and through whose ends is threaded a screw 23. This screw has a hand-wheel 24 for operating the same, and the lower end thereof is rotatably connected with the deck. It will be obvious that when the wheel is turned in the proper direction, the brake band will be clamped on the reel and will prevent the operation thereof. The motor is controlled by means of levers 25. These levers are mounted at the ends of the housing 2, and are connected to the controlling mechanism by flexible members 26, or in any other suitable or desired manner.

In operation when it is desired to operate a boom, the reel pertaining to that boom is connected with the motor. The flexible member of the booms will be wound up, and the free end of the boom will be lifted. When it is desired to lower the boom, the reel is released from the shaft 9, and the boom is permitted to lower by gravity, the speed being controlled by the brake. Each boom may be controlled independently of all the rest. When one reel is moving forwardly under the driving of the motor, the adjacent reel shaft may move rearwardly idly it being understood that the reel is braked while said shaft is running idly.

I claim:—

1. In combination, a mast, a series of booms connected therewith, a block and tackle connected with each boom, a reel for each block and tackle upon which the tackle winds, the reels being arranged in pairs, and a motor for operating said reels, a shaft for each reel on which the reel is journaled, the shafts of each pair of reels being connected with the motor to be driven thereby, a pawl and ratchet mechanism for connecting each reel to its shaft to constrain the reel to move forwardly with the shaft and to permit the reel to move forward freely with respect to the shaft, means for releasing said connection at will, and means for braking each reel, said means comprising a brake ring in connection with the reel and a screw for forcing the ends of the ring together to clamp the ring on the reel.

2. In combination, a mast, a series of booms connected therewith, a block and tackle connected with each boom, a reel for each block and tackle upon which the tackle winds, the reels being arranged in pairs, and a motor for operating said reels, a shaft for each reel on which the reel is journaled, the shafts of each pair of reels being connected with the motor to be driven thereby, a pawl and ratchet mechanism for connecting each reel to its shaft, means for releasing said connection at will, and means for braking each reel.

3. In combination, a mast, a series of booms connected therewith, a block and tackle connected with each boom, a reel for each block and tackle upon which the tackle winds, the reels being arranged in pairs, and a motor for operating said reels, a shaft for each reel on which the reel is journaled, the shafts of each pair of reels being connected with the motor to be driven thereby, a pawl and ratchet mechanism for connecting each reel to its shaft, means for releasing said connection at will.

4. In combination, a mast, a series of booms connected therewith, a block and tackle connected with each boom, a reel for each block and tackle upon which the tackle winds, the reels being arranged in pairs, and a motor for operating said reels, a shaft connected to each reel, the shafts of each pair of reels being connected with the motor, a pawl and ratchet mechanism for connecting each reel to its shaft.

5. In combination, a mast, a series of booms connected therewith, a block and tackle connected with each boom, a reel for each block and tackle upon which the tackle winds, the reels being arranged in pairs, and a motor for operating said reels, a shaft for each reel on which the reel is journaled, the shafts of each pair of reels being connected with the motor, each reel to rotate forwardly with its shaft and to move forwardly freely with respect to the shaft, and means for holding each reel against forward movement.

6. In combination, a mast, a series of booms connected therewith, a block and tackle connected with each boom, a reel for each block and tackle upon which the tackle winds, the reels being arranged in pairs, and a motor for operating said reels, a shaft for each reel on which the reel is journaled, the shafts of said reels being connected with the motor to be driven thereby when the motor is running, each reel to rotate forwardly with its shaft and to move forwardly freely with respect to the shaft.

7. In combination with a mast and the booms connected therewith, the hoisting mechanism connected therewith, of a reel for each boom upon which the hoisting mechanism winds, the reels being arranged in pairs, and a motor for operating said reels, shafts operated by said motor, pawl and ratchet mechanism for connecting the reels to the shafts, means for releasing said connection at will, and means for braking each reel.

PETER JULIUS NIELSEN.